(12) United States Patent
Wang et al.

(10) Patent No.: US 11,699,463 B1
(45) Date of Patent: Jul. 11, 2023

(54) VIDEO PROCESSING METHOD, ELECTRONIC DEVICE, AND NON-TRANSITORY COMPUTER-READABLE STORAGE MEDIUM

(71) Applicant: LEMON INC., Grand Cayman (KY)

(72) Inventors: Xinyao Wang, Los Angeles, CA (US); Yufei Wang, Los Angeles, CA (US); Longyin Wen, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/816,890

(22) Filed: Aug. 2, 2022

(30) Foreign Application Priority Data

Apr. 7, 2022 (CN) .......................... 202210363993.3

(51) Int. Cl.
*G11B 27/031* (2006.01)
*G06V 20/40* (2022.01)
*G06F 40/20* (2020.01)

(52) U.S. Cl.
CPC ............ *G11B 27/031* (2013.01); *G06F 40/20* (2020.01); *G06V 20/46* (2022.01); *G06V 20/49* (2022.01)

(58) Field of Classification Search
CPC ....... G11B 27/031; G06F 40/20; G06V 20/46; G06V 20/49
USPC .......................................................... 386/241
See application file for complete search history.

(56) References Cited

U.S. PATENT DOCUMENTS

| 2010/0306808 | A1 | 12/2010 | Neumeier et al. |
| 2013/0132311 | A1 | 5/2013 | Liu et al. |
| 2018/0190002 | A1* | 7/2018 | Song .................. G06V 20/46 |
| 2019/0114487 | A1 | 4/2019 | Vijayanarasimhan et al. |
| 2022/0124420 | A1* | 4/2022 | Zhang ............... H04N 21/8547 |

FOREIGN PATENT DOCUMENTS

| CN | 109344780 A | 2/2019 |
| CN | 111327945 A | 6/2020 |
| CN | 111988638 A * | 11/2020 ....... H04N 21/23418 |
| CN | 112399269 A | 2/2021 |
| CN | 112861758 A | 5/2021 |
| CN | 113569703 A | 10/2021 |

(Continued)

OTHER PUBLICATIONS

U.S. Appl. No. 17/816,890, filed Oct. 19, 2022_CN_111988638_A_H (Year: 2020).*

(Continued)

*Primary Examiner* — Loi H Tran
(74) *Attorney, Agent, or Firm* — Faegre Drinker Biddle & Reath LLP

(57) ABSTRACT

Provided are a video processing method and apparatus, an electronic device, and a medium. The method includes that a candidate slice information set of an original video is determined based on video information of the original video, the original video is segmented into a plurality of video segments based on each piece of candidate slice information in the candidate slice information set, the plurality of video segments is input into an evaluation model to determine a piece of probability information of each piece of candidate slice information, and target slice information of the original video is determined based on the piece of probability information corresponding to each piece of candidate slice information.

17 Claims, 3 Drawing Sheets

(56) References Cited

FOREIGN PATENT DOCUMENTS

| CN | 113569705 A | 10/2021 | | |
|---|---|---|---|---|
| WO | WO-2020119464 A1 | * | 6/2020 | ............ H04N 21/435 |
| WO | WO-2022134698 A1 | * | 6/2022 | ............ G06F 16/739 |

OTHER PUBLICATIONS

U.S. Appl. No. 17/816,890, filed Oct. 19, 2022_WO_2022134698_A1_M (Year: 2022).*

U.S. Appl. No. 17/816,890, filed Oct. 19, 2022_WO_2020119464_A1_H (Year: 2020).*

Chinese Office Action dated Apr. 27, 2023 in Chinese Application No. 202210363993 3, with English translation (12 pages).

Search Report dated Apr. 25, 2023 in Chinese Application No. 202210363993.3, with English translation (8 pages).

Lv Linjue, "Research on Image Semantic Segmentation Algorithm Based on Deep Learning," Graduate School of National University of Defense Technology, Changsha, Hunan, China, Oct. 2019, with English Abstract.

* cited by examiner

VIDEO PROCESSING METHOD, ELECTRONIC DEVICE, AND NON-TRANSITORY COMPUTER-READABLE STORAGE MEDIUM

CROSS-REFERENCE TO RELATED APPLICATION

This application claims priority to Chinese Patent Application No. 202210363993.3 filed Apr. 7, 2022, the disclosure of which is incorporated herein by reference in its entirety.

TECHNICAL FIELD

Embodiments of the present disclosure relate to the field of computer technology, for example, a video processing method and apparatus, an electronic device, and a medium.

BACKGROUND

With the development of computer technology, various types of applications have increased dramatically such as video applications. Users can browse and update videos through the video applications.

Currently, for various requirements, a video in a video application may be segmented into several segments. Each segment is a video slice. In the related art, when video slices are determined, the segmentation of the video slices is mostly performed in shots. Therefore, the video slices after segmentation are restricted to shots in the video.

SUMMARY

Embodiments of the present disclosure provide a video processing method, an electronic device, and a non-transitory computer-readable storage medium to prevent determined target slice information from being restricted to a shot and improve the accuracy of the target slice information.

An embodiment of the present disclosure provides a video processing method. The method includes the steps described below.

A candidate slice information set of an original video is determined based on video information of the original video.

The original video is segmented into a plurality of video segments based on each piece of candidate slice information of pieces of candidate slice information in the candidate slice information set.

The plurality of video segments is input into an evaluation model to determine a piece of probability information of each piece of candidate slice information.

Target slice information of the original video is determined based on the piece of probability information corresponding to each piece of candidate slice information.

An embodiment of the present disclosure further provides an electronic device. The electronic device includes one or more processing apparatuses and a storage apparatus configured to store one or more programs.

The one or more programs, when executed by the one or more processing apparatuses, cause the one or more processing apparatuses to implement: determining a candidate slice information set of an original video based on video information of the original video; segmenting the original video into a plurality of video segments based on each piece of candidate slice information of pieces of candidate slice information in the candidate slice information set; inputting the plurality of video segments into an evaluation model to determine a piece of probability information of each piece of candidate slice information; and determining target slice information of the original video based on the piece of probability information corresponding to each piece of candidate slice information.

An embodiment of the present disclosure further provides a non-transitory computer-readable medium storing a computer program. The computer program, when executed by a processing apparatus, implements: determining a candidate slice information set of an original video based on video information of the original video; segmenting the original video into a plurality of video segments based on each piece of candidate slice information of pieces of candidate slice information in the candidate slice information set; inputting the plurality of video segments into an evaluation model to determine a piece of probability information of each piece of candidate slice information; and determining target slice information of the original video based on the piece of probability information corresponding to each piece of candidate slice information.

Embodiments of the present disclosure provide a video processing method and apparatus, an electronic device, and a medium. The method includes that a candidate slice information set of an original video is determined based on video information of the original video, the original video is segmented into a plurality of video segments based on each piece of candidate slice information in the candidate slice information set, the plurality of video segments is input into an evaluation model to determine a piece of probability information of each piece of candidate slice information, and target slice information of the original video is determined based on the piece of probability information corresponding to each piece of candidate slice information.

BRIEF DESCRIPTION OF DRAWINGS

The above and other features, advantages, and aspects of embodiments of the present disclosure will become more apparent with reference to the implementations hereinafter in conjunction with drawings. Same or similar reference numerals in the drawings denote same or similar elements. It is to be understood that the drawings are illustrative and that originals and elements are not necessarily drawn to scale.

DETAILED DESCRIPTION

Figure 1:
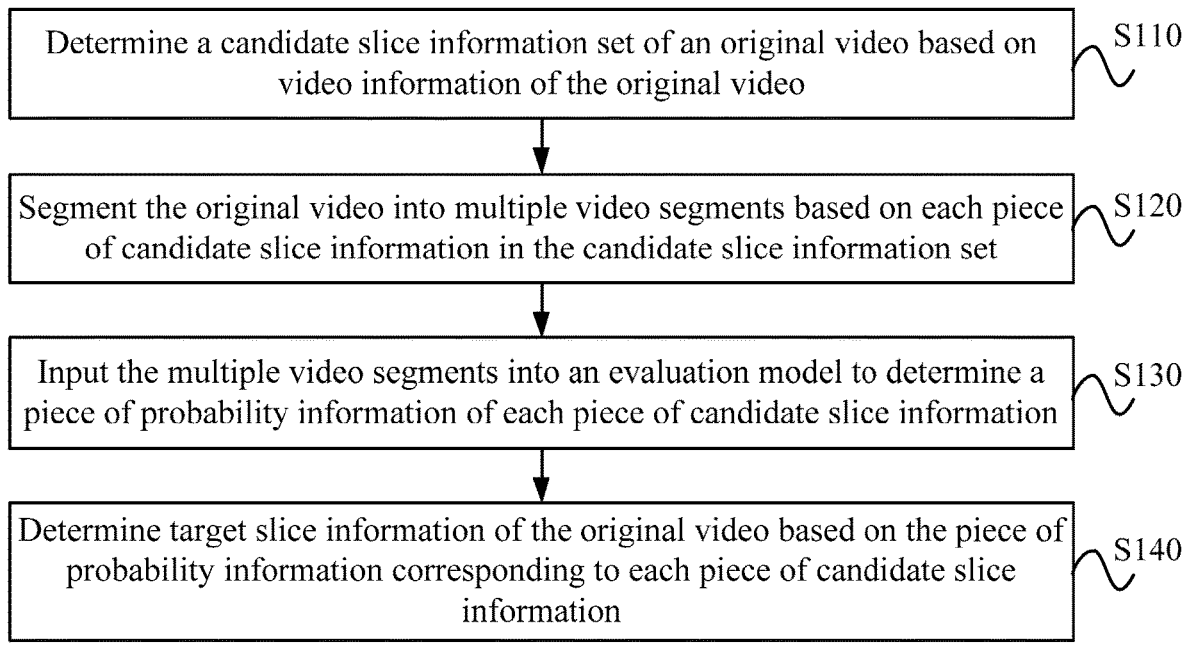
FIG. 1 is a flowchart of a video processing method according to embodiment one of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It should be understood that drawings and embodiments of the present disclosure are merely illustrative and are not intended to limit the scope of the present disclosure.

It should be understood that the various steps recited in method implementations of the present disclosure may be performed in different orders, and/or in parallel. Additionally, the method implementations may include an additional step and/or omit to perform an illustrated step. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one other embodiment"; the term "some embodiments" refers to "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that "one" and "a plurality" mentioned in the present disclosure are illustrative and not limiting, and that those skilled in the art should understand that "one" and "a plurality" should be understood as "one or more" unless clearly expressed in the context.

The names of messages or information exchanged between multiple apparatuses in embodiments of the present disclosure are only for illustrative purposes and are not intended to limit the scope of such messages or information.

Exemplary features and examples are provided in each of multiple embodiments described below. Multiple features described in the embodiments can be combined to form multiple exemplary schemes. Each numbered embodiment should not be regarded as only one scheme. If not conflicted, the embodiments herein and the features thereof may be combined with each other.

Embodiment One

FIG. 1 is a flowchart of a video processing method according to embodiment one of the present disclosure. The method is applicable to the case of video processing and can be performed by a video processing apparatus. The apparatus may be implemented by software and/or hardware and is generally integrated on an electronic device. In this embodiment, the electronic device includes, but is not limited to, a computer, a laptop, a portable Android device and/or a smartphone.

As shown in FIG. 1, a video processing method provided in embodiment one of the present disclosure includes the steps described below.

In S110, a candidate slice information set of an original video is determined based on video information of the original video.

The original video may be a video to be processed, for example, a video which is to be segmented into video slices. The video information may be the information included in the original video, for example, the information characterized by an image, text (for example, a title) and audio in the original video. The candidate slice information set may be understood as a set of pieces of candidate slice information of the original video. A piece of candidate slice information may be the information characterizing a candidate segmentation point, for example, a timestamp. For the piece of candidate slice information, a final segmentation point is required to be determined by a subsequent evaluation and selection so that the final segmentation point is used for segmenting the original video to obtain video slices.

In this embodiment, the candidate slice information set of the original video may be determined based on the video information of the original video. The method for determining the candidate slice information set is not limited. Different pieces of video information correspond to different determination methods. For example, images in the original video may be recognized, and each piece of candidate slice information is determined based on the recognized content. Alternatively, the audio in the original video may be recognized, and each piece of candidate slice information is determined based on the recognized content. Alternatively, the text appearing in the original video may be recognized, and each piece of candidate slice information is determined based on the recognized content. The determination method is not limited in the embodiment.

In an embodiment, the method further includes the steps described below.

If a duration between adjacent pieces of candidate slice information is greater than a set duration threshold, a piece of newly-added slice information is selected between the adjacent pieces of candidate slice information based on a set duration.

The piece of newly-added slice information is used as a piece of candidate slice information and added to the candidate slice information set.

The set duration threshold may be considered as the maximum critical value of the duration between the adjacent pieces of candidate slice information and may be set by the system or related personnel, which is not limited here. The adjacent pieces of candidate slice information may be considered as adjacent pieces of candidate slice information in the candidate slice information set. The piece of newly-added slice information may be considered as a piece of candidate slice information added based on the set duration.

Exemplarily, the adjacent pieces of candidate slice information are candidate timestamps adjacent to each other after timestamps characterized by the pieces of candidate slice information in the candidate slice information set are sorted by time. For example, the candidate slice information set includes three pieces of candidate slice information, that is, first candidate slice information, second candidate slice information, and third candidate slice information, and the first candidate slice information, the second candidate slice information, and the third candidate slice information correspond to a timestamp of 10 seconds, a timestamp of 1 minute, and a timestamp of 3 minutes respectively. The first candidate slice information and the second candidate slice information may be adjacent pieces of candidate slice information. The second candidate slice information and the third candidate slice information may be adjacent pieces of candidate slice information.

The duration of the original video is not limited in the present disclosure and may be determined based on an actual situation. The original video may be a medium-and-long video, for example, a video with a duration of 5 minutes or a video with a duration of 15 minutes.

It is to be understood that when the duration between adjacent pieces of candidate slice information is greater than the set duration threshold, it indicates that the duration between two adjacent pieces of candidate slice information exceeds the maximum critical value of the duration. In this case, a piece of slice information needs to be added to shorten the duration between the two adjacent pieces of candidate slice information.

In an embodiment, when the duration between adjacent pieces of candidate slice information is greater than the set duration threshold, a piece of newly-added candidate slice information, that is, the piece of newly-added slice information, is selected between the adjacent pieces of candidate slice information based on the set duration. Then the piece of newly-added slice information is used as a piece of candidate slice information and added to the candidate slice information set so as to perform a subsequent evaluation. The number of pieces of newly-added slice information is not limited and needs to be determined according to the duration between the adjacent pieces of candidate slice information and the set duration. The set duration may be set by the system or related personnel. For example, the set duration may be 1 s.

Exemplarily, when the duration between the adjacent pieces of candidate slice information is 5 s and the set duration is 1 s, one piece of slice information needs to be newly added every other second. Then a piece of newly-added slice information is used as a piece of candidate slice information and added to the candidate slice information set. It is to be noted that related steps in this embodiment may be performed as a part of step S110 or may be performed after step S110, which is not limited in this embodiment.

In S120, the original video is segmented into multiple video segments based on each piece of candidate slice information in the candidate slice information set.

After the candidate slice information set of the original video is determined, the original video can be segmented according to each piece of candidate slice information in the candidate slice information set so that the original video is segmented into the multiple video segments. For example, the original video is segmented at the position of each timestamp characterized by each piece of candidate slice information to obtain the multiple video segments.

In S130, the multiple video segments are input into an evaluation model to determine a piece of probability information of each piece of candidate slice information.

The piece of probability information may be understood as a probability value for a piece of candidate slice information to serve as a piece of target slice information. The evaluation model may be configured to evaluate each piece of candidate slice information to obtain a corresponding piece of probability information. The evaluation model may be pre-trained by those skilled in the art and is not further described here.

After the multiple video segments are obtained through segmentation, each video segment is input into the evaluation model to determine the piece of probability information of each piece of candidate slice information. A step for determining the piece of probability information is not limited in this embodiment. For example, the piece of probability information may be determined according to the specific content in each video segment.

In S140, target slice information of the original video is determined based on the piece of probability information corresponding to each piece of candidate slice information.

The target slice information may refer to a timestamp corresponding to a finally-determined segmentation point. In this step, the target slice information of the original video may be determined based on the obtained pieces of probability information. The method for determining the target slice information is not limited. For example, the number of pieces of target slice information may be determined first according to the duration of the original video, and then several pieces of probability information with relatively high probability values are selected from pieces of probability information to determine corresponding pieces of target slice information. In another example, a piece of probability information whose probability value is greater than a set probability threshold may be selected from pieces of probability information to determine the target slice information of the original video. The set probability threshold may be set by the system or related personnel, which is not limited in this embodiment.

When the target slice information is selected through the set probability threshold, the target slice information may be determined in combination with a set policy. The set policy may be used for restricting the video segments finally obtained and is not limited here.

According to a video processing method provided in embodiment one of the present disclosure, a candidate slice information set of an original video is determined based on video information of the original video; the original video is segmented into multiple video segments based on each piece of candidate slice information in the candidate slice information set; the multiple video segments are input into an evaluation model to determine a piece of probability information of each piece of candidate slice information; and target slice information of the original video is determined based on the piece of probability information corresponding to each piece of candidate slice information. According to the preceding method, the candidate slice information set is determined first based on the video information, and then the target slice information is determined based on the candidate slice information set and the evaluation model. In this case, the determined target slice information is prevented from being restricted to a shot, and the accuracy of the target slice information is improved.

On the basis of the preceding embodiment, variant embodiments of the preceding embodiment are proposed. It is to be noted that herein, for the brevity of description, only differences from the preceding embodiment will be described in the variant embodiments.

In an embodiment, the video information includes frames of images in the original video, first text information corresponding to audio in the original video, and second text information in the original video. Correspondingly, the step in which the candidate slice information set of the original video is determined based on the video information of the original video includes the steps described below.

A shot cut point of the original video is determined based on the frames of images.

A first statement end point of the original video is determined based on the first text information.

A second statement end point of the original video is determined based on the second text information.

The shot cut point, the first statement end point, and the second statement end point are used as pieces of candidate slice information of the original video and added to the candidate slice information set.

In this embodiment, the first text information may refer to the text information corresponding to the audio in the original video, and the text information may be obtained by recognizing the audio. The second text information may be the text in the original video, for example, the text information obtained by recognizing, for example, a subtitle, a title, and/or a keyword sticker. The first text information and the second text information are merely used for distinguishing different objects from each other and are not limited here.

The shot cut point may be considered as a timestamp of a moment when a shot in the original video is cut. The first statement end point may be considered as a timestamp of a moment when a statement in the first text information in the original video ends. The second statement end point may be considered as a timestamp of an end moment of each statement when the second text information in the original video is segmented into statements. As mentioned above, the first statement end point and the second statement end point are merely used for distinguishing different objects from each other and are not limited here.

In an embodiment, when the candidate slice information set is determined based on the video information of the original video, each piece of candidate slice information is determined according to each frame of image in the original video, the first text information corresponding to the audio in the original video, and the second text information in the original video. The shot cut point of the original video is determined based on the cut state of the shot. The first statement end point of the original video is determined according to the end point of each statement in the first text information. The second statement end point of the original video is determined according to the end point of each piece of text in the second text information. Finally, the shot cut point, the first statement end point, and the second statement end point are used as pieces of candidate slice information of the original video and added to the candidate slice information set. In this embodiment, the sequence of determining the shot cut point, the first statement end point, and the second statement end point is not limited. The shot cut point, the first statement end point, and the second statement end point may be determined simultaneously or sequentially.

In an embodiment, the step in which the multiple video segments are input into the evaluation model to determine the piece of probability information of each piece of candidate slice information includes the steps described below.

Pieces of feature information in the multiple video segments are extracted through a feature extraction module in the evaluation model.

A piece of scoring information corresponding to each piece of feature information is determined through a scoring module in the evaluation model.

The piece of scoring information corresponding to each piece of feature information is determined as the piece of probability information of a corresponding piece of candidate slice information.

In this step, the evaluation model may include the feature extraction module and the scoring module. The feature extraction module may be considered as a model for extracting a feature in each video segment. The scoring module may be considered as a model for evaluating each extracted feature.

This embodiment does not limit the specific content of the feature extraction module and the specific content of the scoring module as long as required functions can be implemented. For example, the feature extraction module may include a visual feature extraction model and a text feature extraction model. One or two text feature extraction modules may be provided. When one text feature extraction module is provided, a feature corresponding to the audio and a feature corresponding to the text may be extracted. When two text feature extraction modules are provided, a feature corresponding to the audio and a feature corresponding to the text may be extracted independently.

After the multiple video segments are input into the evaluation model, the feature information in each video segment is first extracted through the feature extraction module in the evaluation model. The feature information may include an image feature and may also include a text feature, for example, a text feature corresponding to the first text information and/or a text feature corresponding to the second text information. Then each extracted piece of feature information is scored through the scoring module in the evaluation model to determine the piece of scoring information corresponding to each piece of feature information. Finally, the piece of scoring information corresponding to each piece of feature information is determined as the piece of probability information of the corresponding piece of candidate slice information.

Embodiment Two

Figure 2:
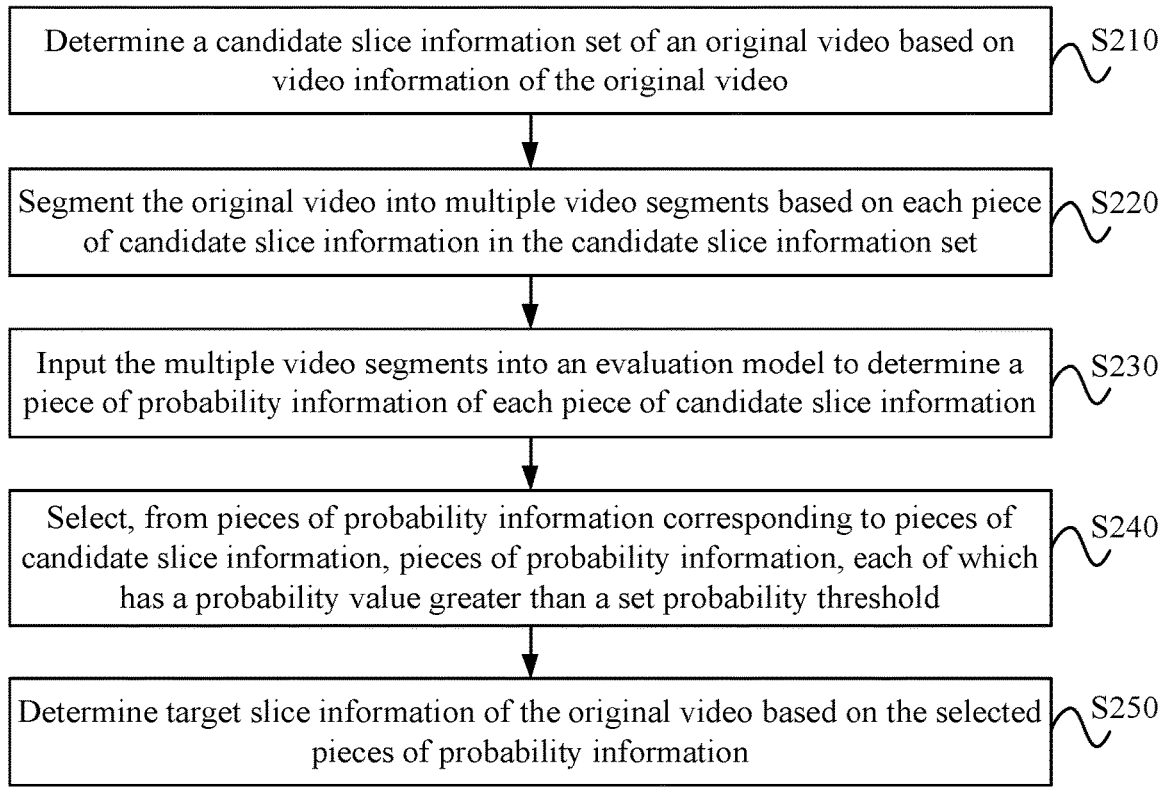
FIG. 2 is a flowchart of a video processing method according to embodiment two of the present disclosure.

FIG. 2 is a flowchart of a video processing method according to embodiment two of the present disclosure. Embodiment two is specified based on exemplary schemes in each preceding embodiment. In this embodiment, the step in which the target slice information of the original video is determined based on the piece of probability information corresponding to each piece of candidate slice information is further specified as the following steps: The pieces of probability information, each of which has a probability value greater than a set probability threshold, are selected from the pieces of probability information corresponding to the pieces of candidate slice information, and the target slice information of the original video is determined based on the selected pieces of probability information.

For the content not detailed in this embodiment, reference may be made to embodiment one.

As shown in FIG. 2, a video processing method provided in embodiment two of the present disclosure includes the steps described below.

In S210, a candidate slice information set of an original video is determined based on video information of the original video.

In S220, the original video is segmented into multiple video segments based on each piece of candidate slice information in the candidate slice information set.

In S230, the multiple video segments are input into an evaluation model to determine a piece of probability information of each piece of candidate slice information.

In S240, pieces of probability information, each of which has a probability value greater than a set probability threshold, are selected from pieces of probability information corresponding to pieces of candidate slice information.

The set probability threshold may be considered as the minimum critical value of a probability value and may be set by related personnel. It is to be understood that when the probability value corresponding to a piece of probability information is greater than the set probability threshold, it indicates that the piece of probability information corresponding to a piece of candidate slice information reaches the minimum critical value. That is, the probability for the piece of candidate slice information to serve as a piece of target slice information is relatively great. Accordingly, the pieces of probability information, each of which has a probability value greater than the set probability threshold, may be selected from the pieces of probability information corresponding to the pieces of candidate slice information to determine the target slice information subsequently.

In S250, target slice information of the original video is determined based on the selected pieces of probability information.

After the pieces of probability information are selected, the target slice information of the original video may be determined based on the selected pieces of probability information. The determination of the target slice information of the original video is not limited here.

Exemplarily, a piece of candidate slice information corresponding to the selected piece of probability information may be directly determined as the target slice information.

Exemplarily, the video segments after segmentation may be analyzed based on the pieces of candidate slice information corresponding to the selected pieces of probability information to determine the target slice information. For example, the original video is segmented, and then the duration of each video segment after segmentation is counted. If the duration of the video segment satisfies a duration requirement, the piece of candidate slice information corresponding to the selected piece of probability information is determined as the target slice information. If the duration of the video segment does not satisfy the duration requirement, the piece of candidate slice information corresponding to the selected piece of probability information is not determined as a piece of target slice information.

According to a video processing method provided in embodiment two of the present disclosure, a candidate slice information set of an original video is determined based on video information of the original video; the original video is segmented into multiple video segments based on each piece of candidate slice information in the candidate slice information set; the multiple video segments are input into an evaluation model to determine a piece of probability information of each piece of candidate slice information; pieces of probability information, each of which has a probability value greater than a set probability threshold, are selected from pieces of probability information corresponding to pieces of candidate slice information; and target slice information of the original video is determined based on the selected pieces of probability information. According to this method, the pieces of probability information, each of which has a probability value greater than the set probability threshold, are selected from the pieces of probability information corresponding to the pieces of candidate slice information to determine the target slice information of the original video so that determined target slice information is more accurate, improving the accuracy of video processing.

In an embodiment, the step in which the target slice information of the original video is determined based on the selected pieces of probability information includes the steps below.

Target probability information is selected from the selected pieces of probability information according to a set policy.

A piece of candidate slice information corresponding to the target probability information is determined as the target slice information.

The set policy may be a selection policy preset by the system and used for selecting the target probability information. The content included in the set policy is not limited. For example, the set policy may include the duration of a single candidate chapter. The target probability information may refer to a piece of probability information corresponding to the target slice information.

In an embodiment, a piece of probability information may be selected again from the selected pieces of probability information according to the set policy to determine the target probability information. Then a piece of candidate slice information corresponding to the target probability information is determined as the target slice information.

In an embodiment, the set policy includes the number of pieces of candidate slice information included in a single candidate chapter and/or the duration of a single candidate chapter.

A single candidate chapter is determined based on adjacent pieces of candidate slice information among the pieces of candidate slice information corresponding to the selected pieces of probability information.

In this embodiment, a single candidate chapter may be considered as each candidate segment after the original video is segmented according to the pieces of candidate slice information corresponding to the selected pieces of probability information. A single candidate chapter may be determined based on adjacent pieces of candidate slice information among the pieces of candidate slice information corresponding to the selected pieces of probability information.

In an embodiment, the set policy may include the number of pieces of candidate slice information included in a single candidate chapter and/or the duration of a single candidate chapter. For example, the number of pieces of candidate slice information included in a single candidate chapter may be set, and the duration of a single candidate chapter may also be set. The specifically-set value may be set by the system and is not limited here.

An exemplary description of a video processing method provided in embodiments of the present disclosure is made hereinafter.

Figure 3:
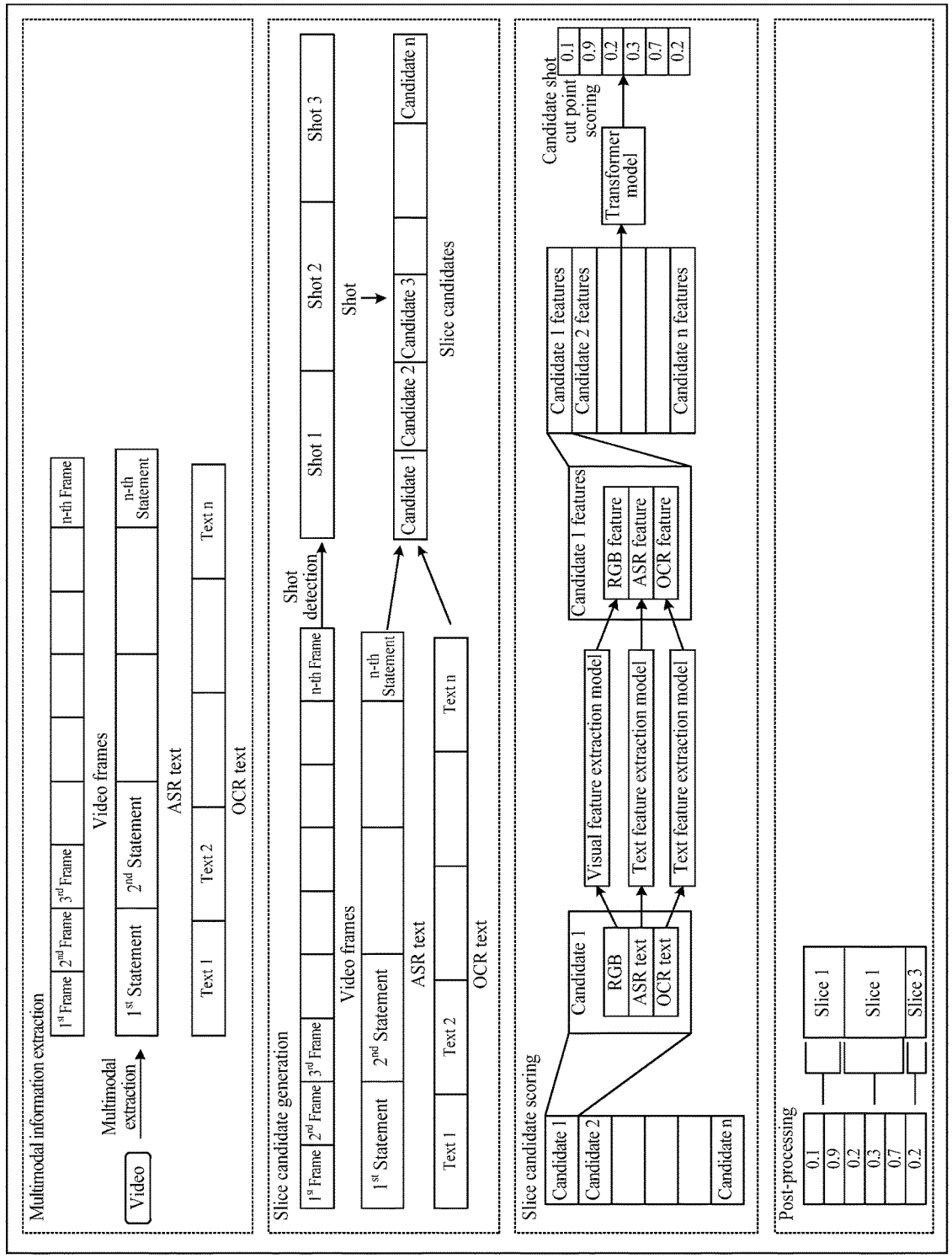
FIG. 3 is a flowchart of a video processing method according to embodiment two of the present disclosure.

FIG. 3 is a flowchart of a video processing method according to embodiment two of the present disclosure. As shown in FIG. 3, multimodal information (that is, the video information of the original video) may be extracted first. That is, the input of an intelligent semantic slice includes multimodal information such as the video, automatic speech recognition (ASR) text, and optical character recognition (OCR) text. When the video is used as the input, it may be considered that the original video is decoded and then frame-split to obtain RGB images (that is, each frame of image in the original video) as the input. The ASR text may be the script obtained by recognizing the audio in the video and may be used as the input in the form of text, that is, the first text information corresponding to the audio in the original video. The OCR text may be the text obtained after a subtitle and other text (for example, a title and a keyword sticker) occurring in the video, that is, the second text information in the original video, is detected. When the multimodal information is extracted, the video for which the multimodal extraction is performed may be considered as the original video. After the multimodal extraction is performed, each frame of image the ASR text, and the OCR text are obtained, where the frame of image is also referred to as a video frame.

Then slice candidates are generated. Pre-processing is performed according to a slice candidate generation rule to obtain the corresponding candidate slice information set. According to each piece of candidate slice information, the video is segmented into multiple segments (that is, multiple video segments, also referred to as chapters) that can serve as potential video slices. Time points of the slices are scored subsequently by the evaluation model so that the finally-cut point (that is, the target slice information) is selected based on post-processing.

As shown in the figure, the slice candidate generation rule may be the time point of a shot cut (that is, a shot cut point), the time point of the end of a statement (that is, a first statement end point and a second statement end point), and/or a time point obtained by performing segmentation with a set duration (for example, the set duration is 1 second) in the case of no shot cut or statement (that is, in the case where the duration between adjacent pieces of candidate slice information is greater than a set duration threshold), that is, a piece of newly-added slice information selected between the adjacent pieces of candidate slice information based on the set duration. Candidates 1 to n may be considered as slice candidates obtained by segmenting the video based on the pieces of candidate slice information. If the video information in a certain video segment is incomplete, complete video information can be acquired for the analysis of the video segment. For example, the first text information corresponding to the audio in candidate 1 is not a complete statement, and then all the text information of the statement is used for subsequent analysis on candidate 1.

Then the slice candidates may be scored. A feature in each slice candidate segment (that is, each of the multiple video segments) is extracted. The probability for a slice point to be the end of a current slice (that is, the probability information of each piece of candidate slice information) is predicted through the evaluation model.

A visual feature (that is, red, green, and blue (RGB)), the ASR text, and the OCR text may be extracted through three different feature extraction models separately. That is, the RGB feature corresponding to the RGB may be obtained through a visual feature extraction model; the ASR feature corresponding to the ASR text may be obtained through a text feature extraction model; and the OCR feature corresponding to the OCR text may be obtained through a text feature extraction model. The features extracted from each video segment are processed through a Transformer model (that is, the scoring module in the evaluation model); moreover, scores are predicted (that is, the piece of scoring information corresponding to each piece of feature information is determined, and the piece of scoring information is determined as a corresponding piece of probability information). Pieces of probability information may correspond to pieces of candidate slice information in a one-to-one manner. Each piece of candidate slice information corresponds to a piece of probability information. In this exemplary embodiment, timestamps in the sequence formed by each feature or each candidate are continuous.

The final stage is the post-processing stage. The scores of the slice candidates are post-processed. The cut point meeting requirements is selected through a threshold (that is, the set probability threshold). That is, the piece of candidate slice information corresponding to the piece of probability information whose probability value is greater than the set probability threshold is selected. Then, a final cut point (that is, the target slice information) is selected through several preset rules (that is, set policies). The rules include, but are not limited to, the maximum number of slices for a single video segment (that is, the number of pieces of candidate slice information included in a single candidate chapter) and/or the longest/shortest time of each video segment (that is, the duration of a single candidate chapter).

As shown in FIG. 3, pieces of probability information corresponding to pieces of candidate slice information are 0.1, 0.9, 0.2, 0.3, 0.7, and 0.2. The probability threshold may be set to 0.5. Pieces of candidate slice information corresponding to probability information 0.9 and probability information 0.7, each of which has a probability value greater than 0.5, are used as pieces of target slice information to obtain slice 1, slice 2, and slice 3.

In this exemplary embodiment, the structured content boundary of the video is predicted according to preset slice granularity and the video is cut into several relatively independent segments, improving the accuracy of video slices.

Embodiment Three

Figure 4:
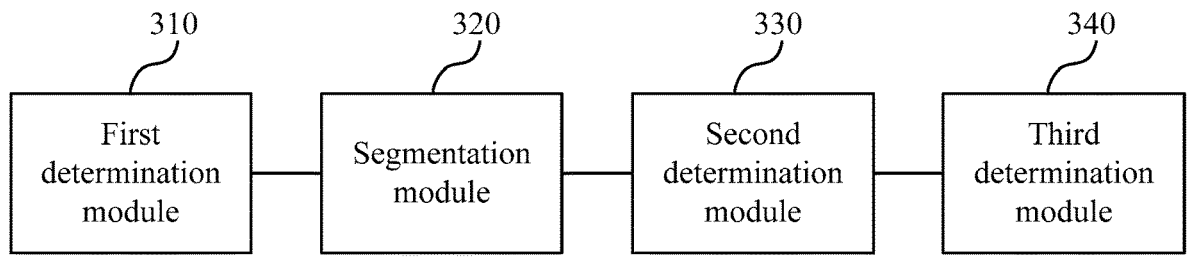
FIG. 4 is a structural diagram of a video processing apparatus according to embodiment three of the present disclosure.

FIG. 4 is a structural diagram of a video processing apparatus according to embodiment three of the present disclosure. The apparatus is applicable to the case of video processing. The apparatus may be implemented by software and/or hardware and is generally integrated on an electronic device.

As shown in FIG. 4, the apparatus includes a first determination module 310, a segmentation module 320, a second determination module 330, and a third determination module 340.

The first determination module 310 is configured to determine a candidate slice information set of an original video based on video information of the original video.

The segmentation module 320 is configured to segment the original video into multiple video segments based on each piece of candidate slice information in the candidate slice information set.

The second determination module 330 is configured to input the multiple video segments into an evaluation model to determine a piece of probability information of each piece of candidate slice information.

The third determination module 340 is configured to determine target slice information of the original video based on the piece of probability information corresponding to each piece of candidate slice information.

In this embodiment, the apparatus includes a first determination module 310, a segmentation module 320, a second determination module 330 and a third determination module 340. The first determination module 310 determines a candidate slice information set of an original video based on video information of the original video, the segmentation module 320 segments the original video into multiple video segments based on each piece of candidate slice information in the candidate slice information set, the second determination module 330 inputs the multiple video segments into an evaluation model to determine a piece of probability information of each piece of candidate slice information, and the third determination module 340 determines target slice information of the original video based on the piece of probability information corresponding to each piece of candidate slice information. According to the apparatus, the candidate slice information set is determined first based on the video information, and then the target slice information is determined based on the candidate slice information set and the evaluation model. In this case, the determined target slice information is prevented from being restricted to a shot, and the accuracy of the target slice information is improved.

Further, the video information includes frames of images in the original video, first text information corresponding to audio in the original video, and second text information in the original video. Correspondingly, the first determination module 310 is configured to perform the operations described below.

A shot cut point of the original video is determined based on the frames of images.

A first statement end point of the original video is determined based on the first text information.

A second statement end point of the original video is determined based on the second text information.

The shot cut point, the first statement end point, and the second statement end point are used as pieces of candidate slice information of the original video and added to the candidate slice information set.

Further, the apparatus further performs the operations described below.

If a duration between adjacent pieces of candidate slice information is greater than a set duration threshold, a piece of newly-added slice information is selected between the adjacent pieces of candidate slice information based on a set duration The piece of newly-added slice information is used as a piece of candidate slice information and added to the candidate slice information set.

Further, the second determination module 330 is configured to perform the operations described below.

Pieces of feature information in the multiple video segments are extracted through a feature extraction module in the evaluation model.

A piece of scoring information corresponding to each piece of feature information is determined through a scoring module in the evaluation model.

The piece of scoring information corresponding to each piece of feature information is determined as the piece of probability information of a respective piece of candidate slice information.

Further, the third determination module 340 includes a selection unit and a determination unit.

The selection unit is configured to select pieces of probability information, each of which has a probability value greater than a set probability threshold, from pieces of probability information corresponding to pieces of candidate slice information.

The determination unit is configured to determine the target slice information of the original video based on the selected pieces of probability information.

Further, the determination unit is configured to perform the operations described below.

Target probability information is selected from the selected pieces of probability information according to a set policy.

A piece of candidate slice information corresponding to the target probability information is determined as the target slice information.

Further, the set policy includes the number of pieces of candidate slice information included in a single candidate chapter and/or the duration of a single candidate chapter.

A single candidate chapter is determined based on adjacent pieces of candidate slice information among pieces of candidate slice information corresponding to the selected pieces of probability information.

The preceding video processing apparatus may perform the video processing method provided in any embodiment of the present disclosure, and has corresponding functional modules and beneficial effects of the performed method.

Embodiment Four

Figure 5:
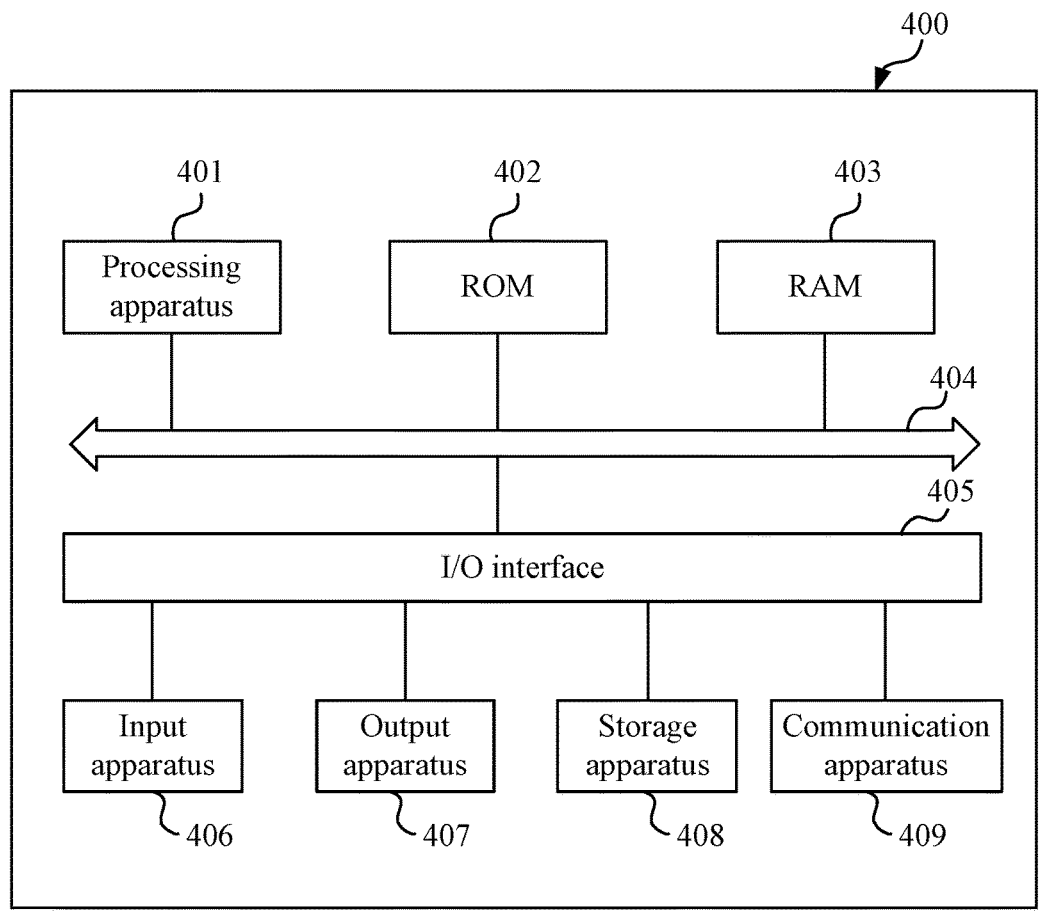
FIG. 5 is a structural diagram of an electronic device according to embodiment four of the present disclosure.

FIG. 5 is a structural diagram of an electronic device according to embodiment four of the present disclosure. FIG. 5 illustrates the structure of an electronic device 400 for implementing embodiments of the present disclosure. The electronic device 400 in embodiments of the present disclosure may include, but is not limited to, mobile terminals such as a mobile phone, a laptop, a digital broadcast receiver, a personal digital assistant (PDA), a portable Android device (PAD), a portable media player (PMP) and an in-vehicle terminal (such as an in-vehicle navigation terminal), and stationary terminals such as a digital television (TV) and a desktop computer. The electronic device 400 shown in FIG. 5 is merely an example and is not intended to limit the function and usage scope of embodiments of the present disclosure.

As shown in FIG. 5, the electronic device 400 may include one or more processing apparatuses 401 (such as a central processing unit and a graphics processing unit). The one or more processing apparatuses 401 may execute, according to a program stored in a read-only memory (ROM) 402 or a program loaded into a random access memory (RAM) 403 from a storage apparatus 408, various appropriate actions and processing. The one or more processing apparatuses 401 implement the video processing method provided in the present disclosure. Various programs and data required for the operations of the electronic device 400 are also stored in the RAM 403. The one or more processing apparatuses 401, the ROM 402, and the RAM 403 are connected to each other through a bus 404. An input/output (I/O) interface 405 is also connected to the bus 404.

Generally, the following apparatuses may be connected to an I/O interface 405: an input apparatus 406 such as a touch screen, a touch pad, a keyboard, a mouse, a camera, a microphone, an accelerometer, and a gyroscope; an output apparatus 407 such as a liquid crystal display (LCD), a speaker, and a vibrator; the storage apparatus 408, such as a magnetic tape and a hard disk, that is used for storing one or more programs; and a communication apparatus 409. The communication apparatus 409 may allow the electronic device 400 to perform wireless or wired communication with other devices to exchange data. Although FIG. 5 shows the electronic device 400 having various apparatuses, it is to be understood that all of the apparatuses shown herein need not be implemented or provided. Alternatively, more or fewer apparatuses may be implemented or provided.

Particularly, according to the embodiment of the present disclosure, the process described above with reference to the flowchart may be implemented as a computer software program. For example, this embodiment of the present disclosure includes a computer program product. The computer program product includes a computer program carried in a computer-readable medium. The computer program includes program codes for performing the method shown in the flowchart. In such an embodiment, the computer program may be downloaded from a network and installed through the communication apparatus 409, or may be installed from the storage apparatus 408, or may be installed from the ROM 402. When the computer program is executed by the one or more processing apparatuses 401, the preceding functions defined in the methods of embodiments of the present disclosure are performed.

It is to be noted that the preceding computer-readable medium in the present disclosure may be a computer-readable signal medium or a computer-readable storage medium or any combination thereof. The computer-readable storage medium may be, but is not limited to, an electrical, magnetic, optical, electromagnetic, infrared or semiconductor system, apparatus or device, or any combination thereof. More examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area network (WAN), an internet (such as the Internet), and a peer-to-peer network (such as an Ad-Hoc network), as well as any currently known or future developed network.

The computer-readable medium may be included in the electronic device 400 or may exist alone without being assembled into the electronic device 400.

The preceding computer-readable medium stores one or more computer programs. The one or more computer programs, when executed by a processing apparatus, implement the steps described below.

A candidate slice information set of an original video is determined based on video information of the original video.

The original video is segmented into multiple video segments based on each piece of candidate slice information in the candidate slice information set.

The multiple video segments are input into an evaluation model to determine a piece of probability information of each piece of candidate slice information.

Target slice information of the original video is determined based on the piece of probability information corresponding to each piece of candidate slice information.

The preceding computer-readable medium carries one or more programs. The preceding one or more programs, when executed by the electronic device 400, causes the electronic device 400 to write computer program codes for performing the operations of the present disclosure in one or more programming languages or a combination thereof. The preceding programming languages include object-oriented programming languages such as Java, Smalltalk and C++, as well as conventional procedural programming languages such as "C" or similar programming languages. Program codes may be executed entirely on a user computer, partly on a user computer, as a stand-alone software package, partly on a user computer and partly on a remote computer, or entirely on a remote computer or a server. In the case where a remote computer is involved, the remote computer may be connected to a user computer via any type of network including a local area network (LAN) or a wide area network (WAN) or may be connected to an external computer (for example, via the Internet provided by an Internet service provider).

The flowcharts and block diagrams in the drawings show the possible architecture, function and operation of the system, method and computer program product according to various embodiments of the present disclosure. Each block in the flowcharts or block diagrams may represent a module, a program segment or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The described modules involved in embodiments of the present disclosure may be implemented in software or hardware. The name of a module is not intended to limit the module in a certain circumstance.

The functions described above herein may be executed, at least partially, by one or more hardware logic components. For example, without limitation, exemplary types of hardware logic components that may be used include a field programmable gate array (FPGA), an application specific integrated circuit (ASIC), application specific standard parts (ASSP), a system on a chip (SOC), a complex programmable logic device (CPLD) and the like.

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

According to one or more embodiments of the present disclosure, example 1 provides a video processing method. The method includes the steps described below.

A candidate slice information set of an original video is determined based on video information of the original video.

The original video is segmented into multiple video segments based on each piece of candidate slice information in the candidate slice information set.

The multiple video segments are input into an evaluation model to determine a piece of probability information of each piece of candidate slice information.

Target slice information of the original video is determined based on the piece of probability information corresponding to each piece of candidate slice information.

According to one or more embodiments of the present disclosure, example 2 further includes the steps described below according to the method described in example 1.

The video information includes frames of images in the original video, first text information corresponding to the audio in the original video, and second text information in the original video. Correspondingly, the step in which the candidate slice information set of the original video is determined based on the video information of the original video includes the steps described below.

A shot cut point of the original video is determined based on the frames of images.

A first statement end point of the original video is determined based on the first text information.

A second statement end point of the original video is determined based on the second text information.

The shot cut point, the first statement end point, and the second statement end point are used as pieces of candidate slice information of the original video and added to the candidate slice information set.

According to one or more embodiments of the present disclosure, example 3 further includes the steps described below according to the method described in example 1.

If a duration between adjacent pieces of candidate slice information is greater than a set duration threshold, a piece of newly-added slice information is selected between the adjacent pieces of candidate slice information based on a set duration.

The piece of newly-added slice information is used as a piece of candidate slice information and added to the candidate slice information set.

According to one or more embodiments of the present disclosure, example 4 further includes the steps described below according to the method described in example 1.

The step in which the multiple video segments are input into the evaluation model to determine the piece of probability information of each piece of candidate slice information includes the steps described below.

Pieces of feature information in the video segments are extracted through a feature extraction module in the evaluation model.

A piece of scoring information corresponding to each piece of feature information is determined through a scoring module in the evaluation model.

The piece of scoring information corresponding to each piece of feature information is determined as the piece of probability information of a corresponding piece of candidate slice information.

According to one or more embodiments of the present disclosure, example 5 further includes the steps described below according to the method described in example 1.

The step in which the target slice information of the original video is determined based on the piece of probability information corresponding to each piece of candidate slice information includes the steps described below.

Pieces of probability information, each of which has a probability value greater than a set probability threshold, are selected from pieces of probability information corresponding to pieces of candidate slice information.

The target slice information of the original video is determined based on the selected pieces of probability information.

According to one or more embodiments of the present disclosure, example 6 further includes the steps described below according to the method described in example 5.

The step in which the target slice information of the original video is determined based on the selected pieces of probability information includes the steps below.

Target probability information is selected from the selected pieces of probability information according to a set policy.

A piece of candidate slice information corresponding to the target probability information is determined as the target slice information.

According to one or more embodiments of the present disclosure, example 7 further includes the content described below according to the method described in example 6.

The set policy includes the number of pieces of candidate slice information included in a single candidate chapter and/or the duration of a single candidate chapter.

A single candidate chapter is determined based on adjacent pieces of candidate slice information among pieces of candidate slice information corresponding to the selected pieces of probability information.

According to one or more embodiments of the present disclosure, example 8 provides a video processing apparatus. The apparatus includes a first determination module, a segmentation module, a second determination module, and a third determination module.

The first determination module is configured to determine a candidate slice information set of an original video based on video information of the original video.

The segmentation module is configured to segment the original video into multiple video segments based on each piece of candidate slice information in the candidate slice information set.

The second determination module is configured to input the multiple video segments into an evaluation model to determine a piece of probability information of each piece of candidate slice information.

The third determination module is configured to determine target slice information of the original video based on the piece of probability information corresponding to each piece of candidate slice information.

According to one or more embodiments of the present disclosure, example 9 provides an electronic device. The electronic device includes one or more processing apparatuses and a storage apparatus configured to store one or more programs.

The one or more programs, when executed by the one or more processing apparatuses, cause the one or more processing apparatuses to implement the method according to any one of examples 1 to 7.

According to one or more embodiments of the present disclosure, example 10 provides a computer-readable medium storing a computer program. The computer program, when executed by a processing apparatus, implements the video processing method according to any one of examples 1 to 7.

The preceding description is merely illustrative of preferred embodiments of the present disclosure and the technical principles used therein. Those of ordinary skill in the art should understand that the scope referred to in the disclosure is not limited to the technical solutions formed by the particular combination of the preceding technical features, but intended to cover other technical solutions which may be formed by any combination of the preceding technical features or their equivalents without departing from the concept of the disclosure, for example, technical solutions formed by mutual substitutions of the preceding feature and the technical features disclosed in the present disclosure (but not limited to) that have similar functions.

In addition, although the operations are depicted in a particular order, this should not be construed as requiring that such operations should be performed in the particular order shown or in sequential order. In certain circumstances, multitasking and parallel processing may be advantageous. Similarly, although implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable sub-combination.

Although the subject matter is described in the language specific to structural features and/or methodological logic acts, it is to be understood that the subject matter defined in the appended claims is not necessarily limited to the features or acts described above. Conversely, the features and acts described above are merely example forms of implementing the claims.

What is claimed is:

1. A video processing method, comprising:
   determining a candidate slice information set of an original video based on video information of the original video;
   segmenting the original video into a plurality of video segments based on each piece of candidate slice information of pieces of candidate slice information in the candidate slice information set;
   inputting the plurality of video segments into an evaluation model to determine a piece of probability information of each piece of candidate slice information; and
   determining target slice information of the original video based on the piece of probability information corresponding to each piece of candidate slice information, wherein the piece of probability information is a probability value for each piece of candidate slice information to serve as a piece of target slice information;
   wherein the method further comprises:
   in response to determining that a duration between adjacent pieces of candidate slice information is greater than a set duration threshold, newly adding one piece of slice information every other set duration threshold between the adjacent pieces of candidate slice information; and
   using all pieces of newly-added slice information between the adjacent pieces of candidate slice information as pieces of candidate slice information and adding all the pieces of newly-added slice information to the candidate slice information set.

2. The method according to claim 1, wherein the video information comprises frames of images in the original video, first text information corresponding to audio in the original video, and second text information in the original video; and wherein determining the candidate slice information set of the original video based on the video information of the original video comprises:
   determining a shot cut point of the original video based on the frames of images;
   determining a first statement end point of the original video based on the first text information;
   determining a second statement end point of the original video based on the second text information; and
   using the shot cut point, the first statement end point, and the second statement end point as pieces of candidate slice information of the original video and adding the shot cut point, the first statement end point, and the second statement end point to the candidate slice information set.

3. The method according to claim 1, wherein inputting the plurality of video segments into the evaluation model to determine the piece of probability information of the each piece of candidate slice information comprises:

extracting, through a feature extraction module in the evaluation model, pieces of feature information in the plurality of video segments;
determining, through a scoring module in the evaluation model, a piece of scoring information corresponding to each piece of feature information of the pieces of feature information; and
determining the piece of scoring information corresponding to each piece of feature information as the piece of probability information of a respective piece of candidate slice information.

4. The method according to claim 1, wherein determining the target slice information of the original video based on the piece of probability information corresponding to the each piece of candidate slice information comprises:
   selecting, from pieces of probability information corresponding to the pieces of candidate slice information, pieces of probability information, each of which has a probability value greater than a set probability threshold; and
   determining the target slice information of the original video based on the selected pieces of probability information.

5. The method according to claim 4, wherein determining the target slice information of the original video based on the selected pieces of probability information comprises:
   selecting, from the selected pieces of probability information, target probability information according to a set policy; and
   determining a piece of candidate slice information corresponding to the target probability information as the target slice information.

6. The method according to claim 5, wherein the set policy comprises at least one of the following:
   a number of pieces of candidate slice information comprised in a single candidate chapter; or
   a duration of a single candidate chapter;
   wherein the single candidate chapter is determined based on adjacent pieces of candidate slice information among pieces of candidate slice information corresponding to the selected pieces of probability information.

7. An electronic device, comprising:
   at least one processing apparatuses; and
   a storage apparatus configured to store at least one program;
   wherein the at least one program, when executed by the at least one processing apparatus, causes the at least one processing apparatus to implement:
   determining a candidate slice information set of an original video based on video information of the original video;
   segmenting the original video into a plurality of video segments based on each piece of candidate slice information of pieces of candidate slice information in the candidate slice information set;
   inputting the plurality of video segments into an evaluation model to determine a piece of probability information of each piece of candidate slice information; and
   determining target slice information of the original video based on the piece of probability information corresponding to each piece of candidate slice information, wherein the piece of probability information is a probability value for each piece of candidate slice information to serve as a piece of target slice information;

wherein the at least one program, when executed by the at least one processing apparatus, causes the at least one processing apparatus to further implement:
in response to determining that a duration between adjacent pieces of candidate slice information is greater than a set duration threshold, newly adding one piece of slice information every other set duration threshold between the adjacent pieces of candidate slice information; and
using all pieces of newly-added slice information between the adjacent pieces of candidate slice information as pieces of candidate slice information and adding all the pieces of newly-added slice information to the candidate slice information set.

8. The electronic device according to claim 7, wherein the video information comprises frames of images in the original video, first text information corresponding to audio in the original video, and second text information in the original video; and wherein the at least one program, when executed by the at least one processing apparatus, causes the at least one processing apparatus to implement determining the candidate slice information set of the original video based on the video information of the original video in the following way:
determining a shot cut point of the original video based on the frames of images;
determining a first statement end point of the original video based on the first text information;
determining a second statement end point of the original video based on the second text information; and
using the shot cut point, the first statement end point, and the second statement end point as pieces of candidate slice information of the original video and adding the shot cut point, the first statement end point, and the second statement end point to the candidate slice information set.

9. The electronic device according to claim 7, wherein the at least one program, when executed by the at least one processing apparatus, causes the at least one processing apparatus to further implement inputting the plurality of video segments into the evaluation model to determine the piece of probability information of the each piece of candidate slice information in the following way:
extracting, through a feature extraction module in the evaluation model, pieces of feature information in the plurality of video segments;
determining, through a scoring module in the evaluation model, a piece of scoring information corresponding to each piece of feature information of the pieces of feature information; and
determining the piece of scoring information corresponding to each piece of feature information as the piece of probability information of a respective piece of candidate slice information.

10. The electronic device according to claim 7, wherein the at least one program, when executed by the at least one processing apparatus, causes the at least one processing apparatus to further implement determining the target slice information of the original video based on the piece of probability information corresponding to the each piece of candidate slice information in the following way:
selecting, from pieces of probability information corresponding to the pieces of candidate slice information, pieces of probability information, each of which has a probability value greater than a set probability threshold; and
determining the target slice information of the original video based on the selected pieces of probability information.

11. The electronic device according to claim 10, wherein the at least one program, when executed by the at least one processing apparatus, causes the at least one processing apparatus to further implement determining the target slice information of the original video based on the selected pieces of probability information in the following way:
selecting, from the selected pieces of probability information, target probability information according to a set policy; and
determining a piece of candidate slice information corresponding to the target probability information as the target slice information.

12. The electronic device according to claim 11, wherein the set policy comprises at least one of the following:
a number of pieces of candidate slice information comprised in a single candidate chapter; or
a duration of a single candidate chapter;
wherein the single candidate chapter is determined based on adjacent pieces of candidate slice information among pieces of candidate slice information corresponding to the selected pieces of probability information.

13. A non-transitory computer-readable storage medium storing a computer program, wherein the computer program, when executed by a processing apparatus, implements:
determining a candidate slice information set of an original video based on video information of the original video;
segmenting the original video into a plurality of video segments based on each piece of candidate slice information of pieces of candidate slice information in the candidate slice information set;
inputting the plurality of video segments into an evaluation model to determine a piece of probability information of each piece of candidate slice information; and
determining target slice information of the original video based on the piece of probability information corresponding to each piece of candidate slice information, wherein the piece of probability information is a probability value for each piece of candidate slice information to serve as a piece of target slice information;
wherein the computer program, when executed by a processing apparatus, further implements:
in response to determining that a duration between adjacent pieces of candidate slice information is greater than a set duration threshold, newly adding one piece of slice information every other set duration threshold between the adjacent pieces of candidate slice information; and
using all pieces of newly-added slice information between the adjacent pieces of candidate slice information as pieces of candidate slice information and adding all the pieces of newly-added slice information to the candidate slice information set.

14. The non-transitory computer-readable storage medium according to claim 13, wherein the video information comprises frames of images in the original video, first text information corresponding to audio in the original video, and second text information in the original video; and wherein the computer program, when executed by a processing apparatus, implements determining the candidate slice information set of the original video based on the video information of the original video in the following way:

determining a shot cut point of the original video based on the frames of images;

determining a first statement end point of the original video based on the first text information;

determining a second statement end point of the original video based on the second text information; and using the shot cut point, the first statement end point, and the second statement end point as pieces of candidate slice information of the original video and adding the shot cut point, the first statement end point, and the second statement end point to the candidate slice information set.

15. The non-transitory computer-readable storage medium according to claim 13, wherein the computer program, when executed by a processing apparatus, implements inputting the plurality of video segments into the evaluation model to determine the piece of probability information of the each piece of candidate slice information in the following way:

extracting, through a feature extraction module in the evaluation model, pieces of feature information in the plurality of video segments;

determining, through a scoring module in the evaluation model, a piece of scoring information corresponding to each piece of feature information of the pieces of feature information; and determining the piece of scoring information corresponding to each piece of feature information as the piece of probability information of a respective piece of candidate slice information.

16. The non-transitory computer-readable storage medium according to claim 13, wherein the computer program, when executed by a processing apparatus, implements determining the target slice information of the original video based on the piece of probability information corresponding to the each piece of candidate slice information in the following way:

selecting, from pieces of probability information corresponding to the pieces of candidate slice information, pieces of probability information, each of which has a probability value greater than a set probability threshold; and determining the target slice information of the original video based on the selected pieces of probability information.

17. The non-transitory computer-readable storage medium according to claim 16, wherein the computer program, when executed by a processing apparatus, implements determining the target slice information of the original video based on the selected pieces of probability information in the following way:

selecting, from the selected pieces of probability information, target probability information according to a set policy; and determining a piece of candidate slice information corresponding to the target probability information as the target slice information.

\* \* \* \* \*